(12) United States Patent
Duhon

(10) Patent No.: US 8,656,679 B1
(45) Date of Patent: Feb. 25, 2014

(54) INTERCONNECTABLE REFRACTORY ANCHOR

(71) Applicant: Robert J. Jenkins & Company, Webster, TX (US)

(72) Inventor: Donavin Duhon, League City, TX (US)

(73) Assignee: Robert J. Jenkins & Company, Webster, TX (US)

( * ) Notice: Subject to any disclaimer, the term of this patent is extended or adjusted under 35 U.S.C. 154(b) by 0 days.

(21) Appl. No.: 13/722,772

(22) Filed: Dec. 20, 2012

(51) Int. Cl.
*E04B 1/38* (2006.01)
*E04B 1/19* (2006.01)

(52) U.S. Cl.
USPC ............... 52/713; 52/334; 52/712; 52/507

(58) Field of Classification Search
USPC ......... 52/378, 334–337, 443, 506.02, 747.13, 52/348, 513, 514, 353, 396.01, 122.1, 52/125.1, 125.2, 125.4, 125.5, 245, 249, 52/269, 278, 357–365, 370, 383, 410, 449, 52/478–479, 484, 506, 509, 512, 687, 698, 52/699, 712–715, 507, 633, 636–637, 344, 52/648.1, 653.1; D8/384; 432/118–119; 110/338–339, 336; 269/53
See application file for complete search history.

(56) References Cited

U.S. PATENT DOCUMENTS

| | | | | |
|---|---|---|---|---|
| 4,546,827 A * | 10/1985 | Wachendorfer, Sr. | ........ | 165/165 |
| 4,651,487 A * | 3/1987 | Nishikawa | ....................... | 52/378 |
| 4,753,053 A * | 6/1988 | Heard | .............. | 52/712 |
| 6,393,789 B1 * | 5/2002 | Lanclos | .......................... | 52/378 |
| 7,178,299 B2 * | 2/2007 | Hyde et al. | ...................... | 52/388 |

\* cited by examiner

*Primary Examiner* — Jeanette E. Chapman
(74) *Attorney, Agent, or Firm* — Buskop Law Group, PC; Wendy Buskop

(57) ABSTRACT

An interconnectable refractory anchor for receiving moldable refractory material together and creating a protective ceramic refractory lining minimizing erosion and increasing the useful life of refractory linings in reactors and vessels. The interconnected anchoring system comprises a plurality of interconnectable refractory anchors for use in a high temperature severe duty environment. The steps of the method comprise interconnecting a plurality of refractory anchors, fastening the interconnected anchoring system to a vessel, fitting a moldable refractory material into the spaces, and curing the moldable refractory material to service temperature creating a protective ceramic refractory lining for the vessel.

11 Claims, 5 Drawing Sheets

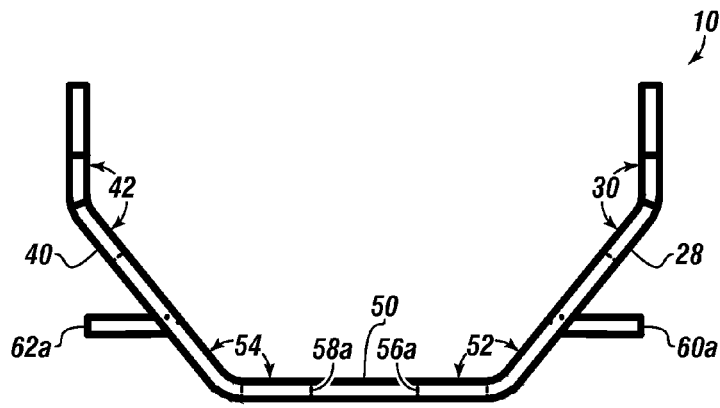
FIGURE 2A
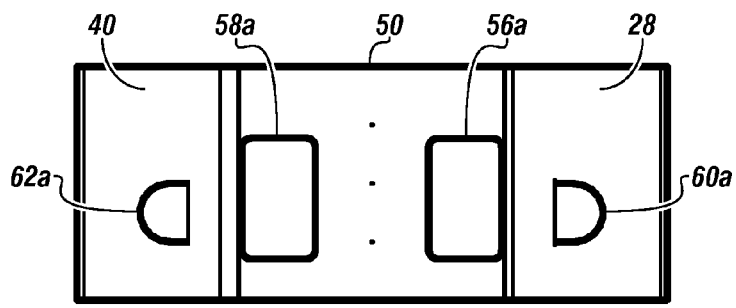
FIGURE 2B
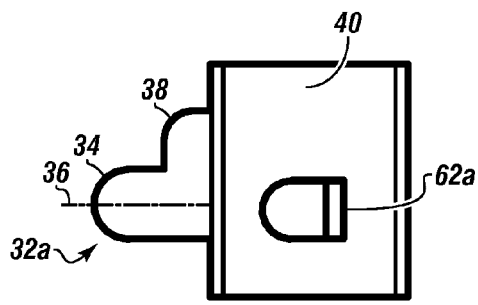　　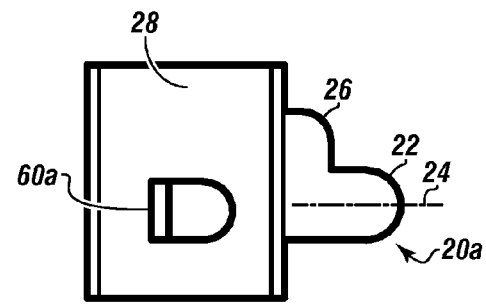
FIGURE 2C　　FIGURE 2D

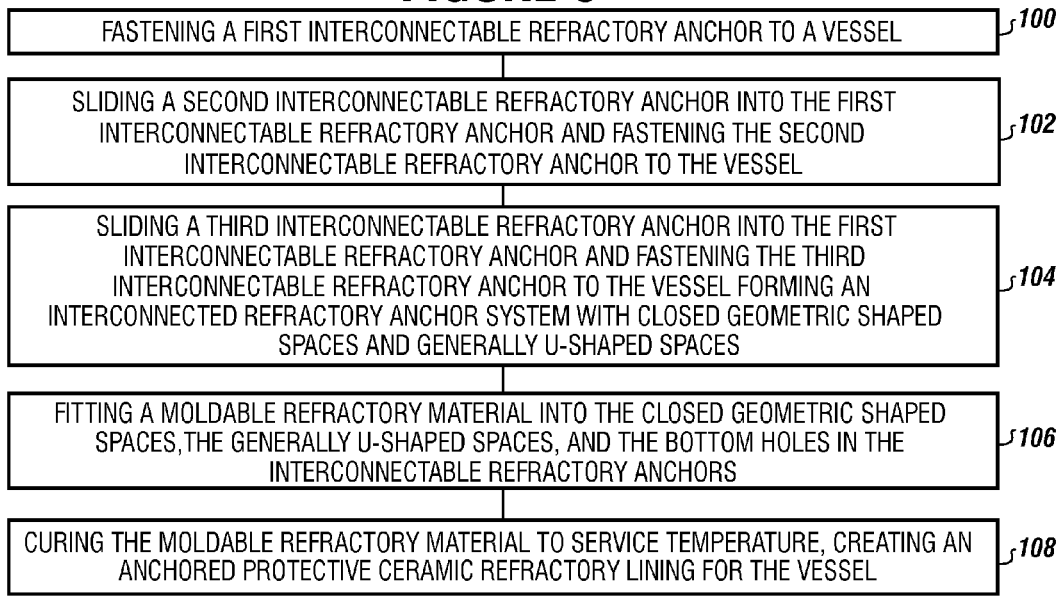

INTERCONNECTABLE REFRACTORY ANCHOR

FIELD

The present embodiments generally relate to an interconnectable refractory anchor usable in an interconnected anchoring system and a method for using.

BACKGROUND

A need exists for an anchoring system that allows a refractory protective lining to survive more difficult conditions and prevent leaking of toxic materials from the vessel. The service typically running through a vessel with a refractory lining includes transfer of heated petrochemicals, which when the heated petrochemicals contact the atmosphere, ignite. The current anchoring system helps prevent disastrous fires due to leaks from vessels with refractory linings.

A further need exists for an anchoring system that is easy to install for workers who are suspended 50 feet or more above a hard, steel grid surface.

Current systems involve workers climbing tubular scaffolds with one hand while holding panels of anchor assemblies with the other hand and stepping on slippery powdery substances.

The present system allows workers to use both hands to climb up a tubular scaffold with a bucket filled with disassembled interlocking anchors tied to their bodies, eliminating the need to carry a completely assembled panel up a scaffolding structure.

This unique system helps workers move safely in the vessel and perform the installation task. This unique anchoring system improves worker safety by minimizing falls from scaffolds thus minimizing injuries or fatal trauma.

The present embodiments meet these needs.

BRIEF DESCRIPTION OF THE DRAWINGS

The detailed description will be better understood in conjunction with the accompanying drawings as follows:

FIGS. 2A-2D are detailed views of the interconnectable refractory anchor.

FIG. 5 depicts the step of the method for structurally anchoring a protective ceramic refractory lining to the equipment.

Figure 1:
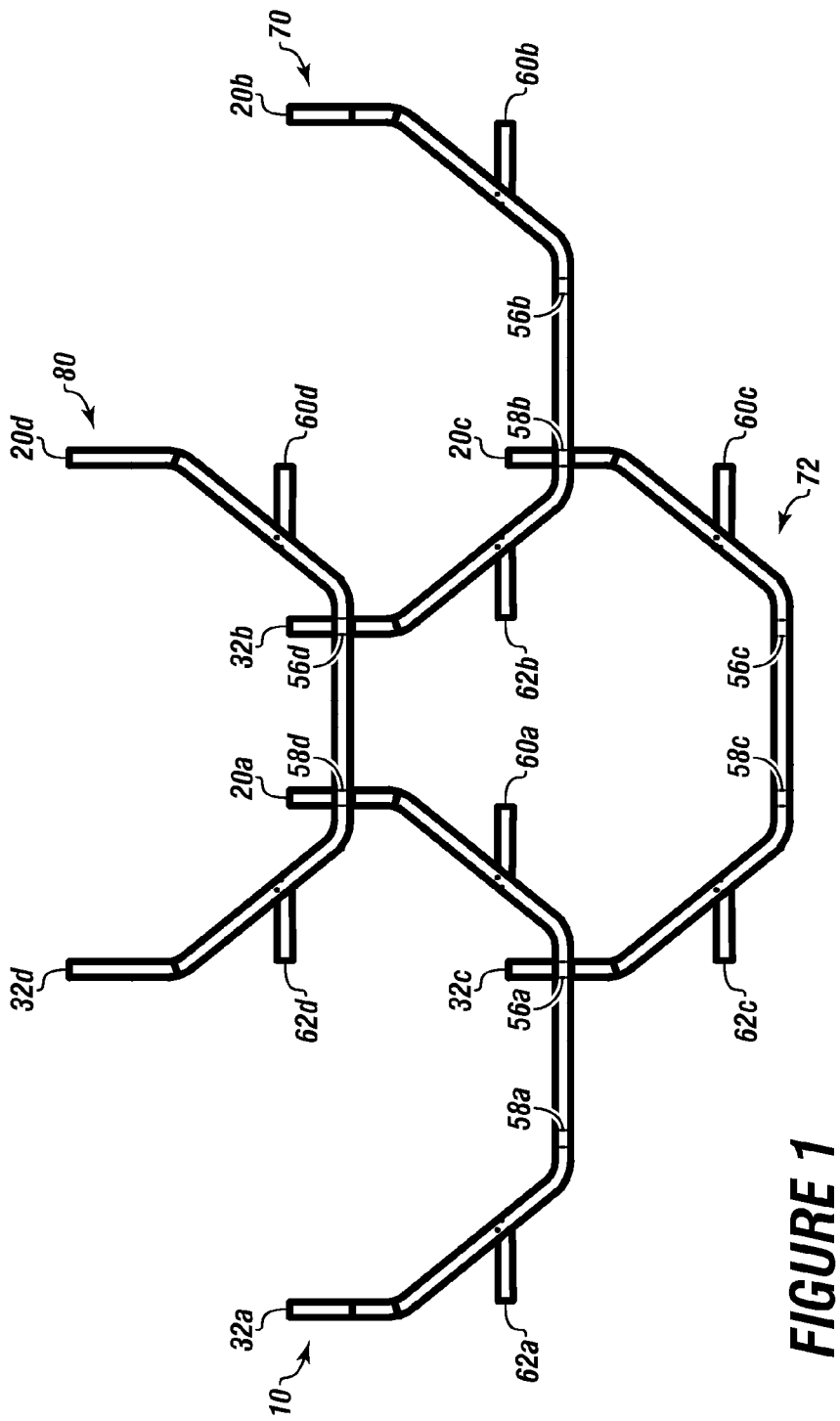
FIG. 1 is a detail of four interlocked interconnectable refractory anchors according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to an interconnectable refractory anchor usable in an interconnected anchoring system, the interconnected anchoring system, and a method for using the interconnectable refractory anchors.

The interconnected anchoring system recreates the standard acceptable anchoring system found in most equipment.

The interlocking feature of the individual anchors improves the structural integrity of the interconnected anchoring system over other non-connected individualized anchors by providing increased rigidity.

The manner in which the anchors interlock decreases the difficulty of anchor lay out and removes the possibility of anchor pattern errors.

The interlocking feature of the anchor system improves the weldability of the interconnected anchoring system over traditional hex metal anchoring systems by holding successive anchors together in place making the welding task easier.

In one or more embodiments, the service typically running through a petrochemical containing vessel with a refractory lining includes heated petrochemicals, which when the heated petrochemicals contact the atmosphere, may ignite. The current anchoring system helps prevent disastrous fires at a petrochemical plant due to leaks from vessels with refractory linings because linings with this system are less susceptible to instant failure.

This system allows workers to work more easily in confined spaces because the individual anchors can be individually placed, requiring fewer tools and less room for maneuvering. Also multiple workers can work in a small space at the same time so that they can make a needed environmental safety repair quickly.

The anchoring system and anchors prevent worker entrapment in a vessel, when a large panel falls on them. The system helps workers stay safe, reduces accidents.

The interlocking feature of the anchoring system improves the weldability of the anchoring system over traditional metal anchoring systems by holding successive anchors together in place in an interlock, making the welding task easier for subsequent anchors.

The individualized interlocking anchor allows expanded metallurgical choices over the traditional metal anchors.

The individualized interlocking anchor system allows the choice of solution annealing whereas the traditional metal anchoring system does not.

The individualized interlocking anchor allows the choice of different lining thicknesses and configurations.

The individualized interlocking anchor allows the increased flexibility of the anchoring system along two different planes so an installation can be performed in two different planes, an x-plane and a y-plane, and the installation can be formed on the two different axes simultaneously.

The embodiments relate to an interconnectable refractory anchor for receiving moldable refractory material wherein the material and the anchor, together create a protective ceramic refractory lining minimizing erosion and increasing the useful life of refractory linings in vessels, such as petrochemical vessels, reaction vessels, tanks, and pipelines.

The interconnectable refractory anchor can be used in an anchoring system that can be used with an equipment item usable in a high temperature severe duty environment having a protective ceramic refractory lining attached to a vessel by means of the anchoring system.

The tabs can be angled, that is, oriented obliquely away from each side, and each side, and each side can be angled, that is, oriented obliquely away from the bottom side.

The interconnectable refractory anchors can be composed of a material, such as carbon steel, stainless steel, nickel alloy steel, graphite composite, graphite nanotubes, aluminum, and combinations thereof.

The width of each tab of the interconnectable refractory anchor can range from about 40 percent to about 80 percent of a width of each side.

In an embodiment, the width of a tab can be about 0.3 inches wide to about 6.5 inches In an embodiment, the width of each tab can be identical to the width of the side and the bottom side.

The width of each side of the interconnectable refractory anchor can be about 40 percent to 100 percent of a width of the bottom side.

In an embodiment, the width of a side can be from about ¾ inches to about 8 inches wide.

In one or more embodiments, the tabs, sides and bottom can be planar with a thickness from about 0.02 inches to about 0.5 inches.

In an embodiment, the interconnectable refractory anchor can have at least one obtuse angle, which can be an angle from 90 degrees to 180 degrees.

In one or more embodiments, the interconnectable refractory anchor can be secured to the vessel by welding. In one or more embodiments, the interconnectable refractory anchor can be one piece.

In embodiments, each tab main body of the interconnectable refractory anchor can extend through each bottom hole. The interconnection between anchors forms a space for containing refractory material.

The space between the interconnected anchors can be a closed geometric shaped space, such as a hex shape or a generally U-shaped space.

The tabs, sides, and bottom of the interconnectable refractory anchor can be planar with a thickness ranging from about 0.2 inches to about 0.5 inches.

The moldable refractory material usable with the interconnectable refractory anchor can be a metal fiber reinforced refractory material.

Turning to the Figures, FIG. 1 depicts four interconnectable refractory anchors according to one or more embodiments.

A plurality of interconnectable refractory anchors 10, 70, 72, and 80 are shown interconnected with one another without a weld forming an interconnected anchoring system, wherein the plurality of interconnected refractory anchors can be attached to a vessel.

In one or more embodiments, the vessel can be a petrochemical vessel such as a cyclone or a fluidized catalytic cracking unit.

In one or more embodiments, the plurality of interconnected refractory anchors can be attached to the vessel by a fastening means, such as a fastener, a rivet, a bolt, a weldable stud, epoxy, by welding, or another similar fastening means.

Each interconnectable refractory anchor 10, 70, 72, and 80 can each have a first tab 20a, 20b, 20c, and 20d and a second tab 32a, 32b, 32c, and 32d.

Each interconnectable refractory anchor 10, 70, 72, and 80 can include a first punched lance 60a, 60b, 60c, and 60d and a second punched lance 62a, 62b, 62c, and 62d, wherein the punched lances are adapted to contain moldable refractory material.

In one or more embodiments, the punched lances can be pressed out by a machine that bends out the lance, forming an integral unit. The punched lances can hold the moldable refractory material in place in the places formed by the interconnectable refractory anchors.

The first tabs 20a, 20b, 20c, and 20d can engage second bottom holes 58a, 58b, 58c, and 58d and the second tabs 32a, 32b, 32c, and 32d can engage first bottom holes 56a, 56b, 56c, and 56d.

FIGS. 2A-2D depict the interconnectable refractory anchor according to one or more embodiments. FIG. 2A is a top view of an interconnectable refractory anchor. FIG. 2B is a planar view of the bottom side of the interconnectable refractory anchor. FIG. 2C is a detail of the second tab of the interconnectable refractory anchor. FIG. 2D is a detail of the first tab of the interconnectable refractory anchor.

The interconnectable refractory anchor 10 can include a first tab 20a comprising a first tab main body 22 having a first tab body longitudinal axis 24 and a first tab spacer guide 26 extending transversely, such as at a right angle, to the first tab body longitudinal axis 24 of the first tab main body 22.

The interconnectable refractory anchor 10 can include a first side 28 integrally connected at a first angle 30 that can be about 90 degrees to about 180 degrees to the first tab 20a.

The interconnectable refractory anchor 10 can include a second tab 32a comprising a second tab main body 34 having a second tab body longitudinal axis 36 and a second tab spacer guide 38 extending transversely, such as at a right angle, to the second tab body longitudinal axis 36 of the second tab main body 34.

The interconnectable refractory anchor 10 can include a second side 40 integrally connected at a second angle 42 that can be about 90 degrees to about 180 degrees to the second tab 32a.

The interconnectable refractory anchor 10 can include a bottom side 50 integrally connected at a third angle 52 that can be about 90 degrees to about 180 degrees to the first side 28 and simultaneously integrally connected at a fourth angle 54 that can be about 90 degrees to about 180 degrees to the second side 40, wherein the bottom side 50 comprises a first bottom hole 56a spaced apart from a second bottom hole 58a.

The bottom holes can be square, rectangular, circular, or another geometric shape that matches the shape of the first and second tabs.

In embodiments, the bottom holes can have a length from about 0.18 inches to about 7.9 inches and a width from about 0.05 inches to about 0.75 inches. In embodiments, the bottom holes can be of any size that allows a snug fit of the first and second tabs in the holes.

In an embodiment, the bottom holes can be filled with the moldable refractory material, to further lock the anchors together, safely, securely, and easily.

The interconnectable refractory anchor 10 can include at least one first punched lance 60a formed centrally in the first side 28; and at least one second punched lance 62a formed centrally in the second side 40, wherein the punched lances are adapted to contain moldable refractory material.

Figure 3A:
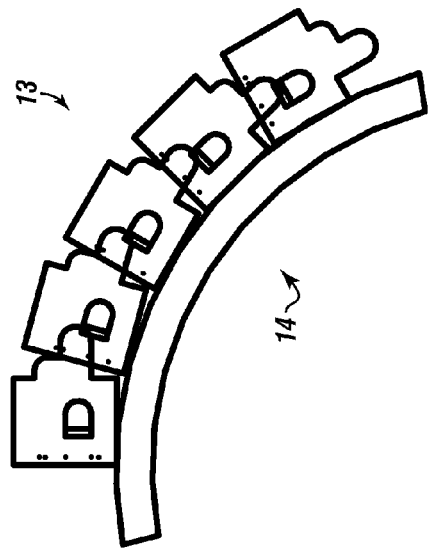
FIG. 3A shows an internally mounted interconnected anchoring system mounted to a vessel.

FIG. 3A shows an internally mounted interconnected anchoring system 13 mounted to a vessel 14.

In one or more embodiments, the vessel needing an anchoring system can include a side wall of third stage separator for a hydrocracking process.

Figure 3B:
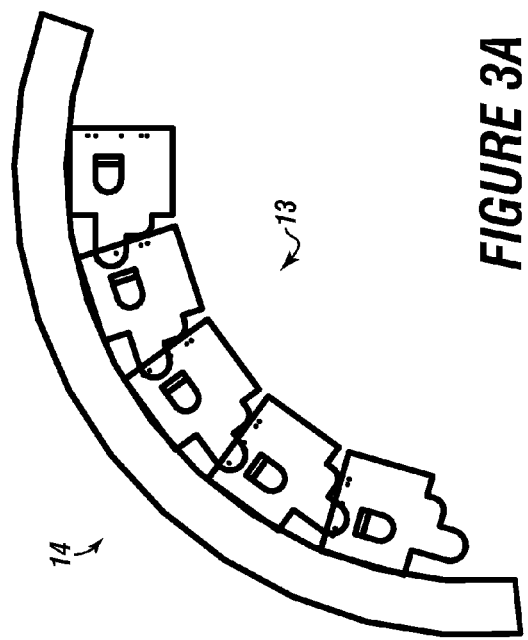
FIG. 3B shows an externally mounted interconnected anchoring system mounted to the vessel.

FIG. 3B shows an externally mounted interconnected anchoring system 13 mounted to the vessel 14.

In one or more embodiments, the vessel can be a dipleg, which is part of a fluid cracking unit.

Figure 3C:
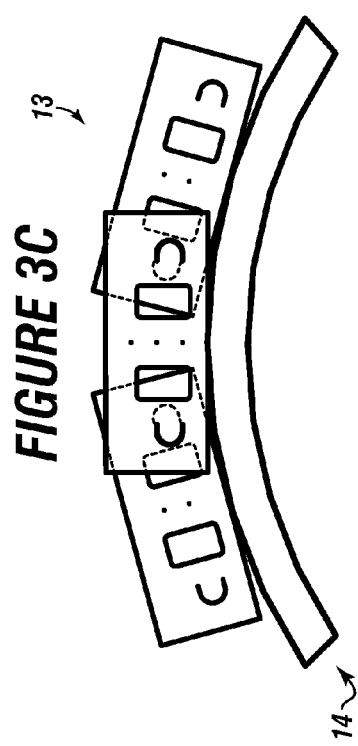
FIG. 3C shows an externally mounted interconnected anchoring system mounted to the vessel.

FIG. 3C shows an externally mounted interconnected anchoring system 13 mounted to the vessel 14, wherein the interconnected anchoring system is shown mounted in three different planes.

Being able to mount in multiple planes simultaneously allows for more flexibility than other systems.

Figure 4:
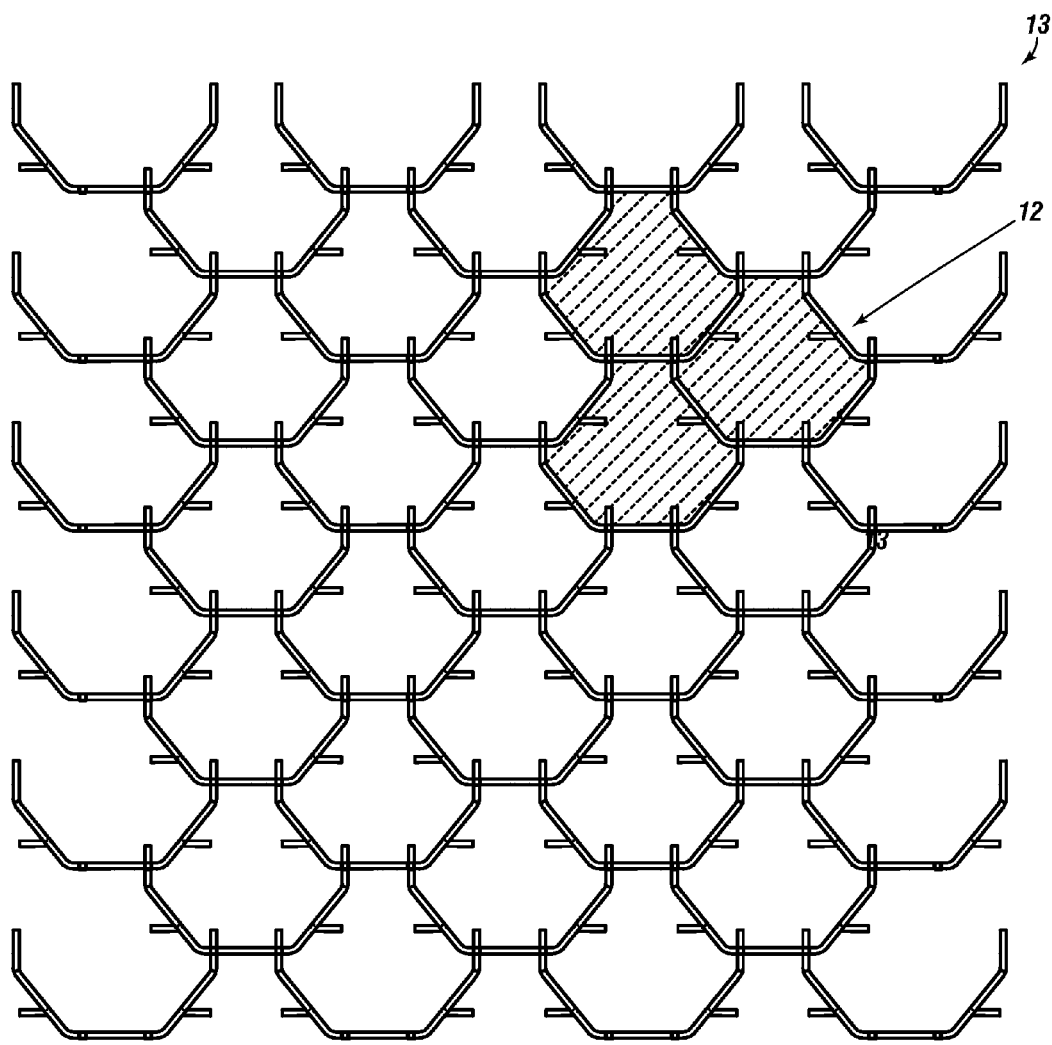
FIG. 4 is a top view of a large interconnected anchoring system mounted to a vessel partially filled with moldable refractory material.

FIG. 4 depicts the interconnected anchoring system according to one or more embodiments.

The interconnected anchoring system 13, wherein each interconnectable refractory anchor, when interconnected with at least one other interconnectable refractory anchor, can contain a moldable refractory material 12 inserted within spaces in the interconnected anchoring system 13.

The moldable refractory material is adapted to cure to a service temperature creating a protective ceramic refractory lining over an equipment item. The interconnectable refractory anchors can sustain a curing temperature that is initially an air set cure, and then operation temperature is applied to the refractory material, such as 1000 degrees Fahrenheit but not less than 800 degrees Fahrenheit.

The interconnectable refractory anchor and the interconnected anchoring system can be usable in a method of insulating a vessel with a moldable refractory material. The vessel can be made of equipment for use in a high temperature severe duty environment.

FIG. 5 depicts the step of the method for structurally anchoring a protective ceramic refractory lining to the equipment.

The method can include fastening a first interconnectable refractory anchor to a vessel, as illustrated in box 100.

The method can include sliding a second interconnectable refractory anchor into the first interconnectable refractory anchor and fastening the second interconnectable refractory anchor to the vessel, as illustrated in box 102.

The method can include sliding a third interconnectable refractory anchor into the first interconnectable refractory anchor and fastening the third interconnectable to the vessel forming an interconnected anchoring system with closed geometric shaped spaces and generally U-shaped spaces, as illustrated in box 104.

The method can include fitting a moldable refractory material into the closed geometric shaped spaces, the generally U-shaped spaces, and the bottom holes in the interconnectable refractory anchors, as illustrated in box 106.

The method can include curing the moldable refractory material to service temperature, creating an anchored protective ceramic refractory lining for the vessel, as illustrated in box 108.

In embodiments, when the moldable refractory material is manually packed into the closed geometric shaped spaces and generally U-shaped spaces of the interconnected anchoring system, force can be applied to the packed moldable refractory material using a member of the group comprising: a ram, a pneumatic hammer, a trowel, a vibrator, or combinations thereof.

In embodiments, the curing of the moldable refractory material can be performed with forced air heating wherein the air temperature exceeds 800 degrees Fahrenheit.

While these embodiments have been described with emphasis on the embodiments, it should be understood that within the scope of the appended claims, the embodiments might be practiced other than as specifically described herein.

What is claimed is:

1. An interconnectable refractory anchor for receiving moldable refractory material together creating a protective ceramic refractory lining minimizing erosion and increasing the useful life of the protective ceramic refractory lining in a vessel, the interconnectable refractory anchor comprising:
   a. a first tab comprising a first tab main body having a longitudinal axis and first tab spacer guide extending transversely to the longitudinal axis of the first tab main body;
   b. a first side integrally connected at a first obtuse angle to the first tab;
   c. a second tab comprising a second tab main body having a longitudinal axis and a second tab spacer guide extending transversely to the longitudinal axis of the second tab main body;
   d. a second side integrally connected at a second obtuse angle to the second tab;
   e. a bottom side integrally connected at a third obtuse angle with the first side and simultaneously integrally connected at a fourth obtuse angle with the second side, wherein the bottom side comprises a first bottom hole spaced apart from a second bottom hole; and
   f. at least one first punched lance formed centrally in the first side; and at least one second punched lance formed centrally in the second side, wherein the punched lances are adapted to contain moldable refractory material; and wherein the first tab of the interconnectable refractory anchor engages a second bottom hole of a second interconnectable refractory anchor and a second tab of a third interconnectable refractory anchor engages a first bottom hole of the second interconnectable refractory anchor.

2. The interconnectable refractory anchor of claim 1, further wherein the tabs are oriented obliquely away from each side; and each side is oriented obliquely away from the bottom side.

3. The interconnectable refractory anchor of claim 1, wherein the interconnectable refractory anchor is composed of a material selected from the group consisting of: carbon steel, stainless steel, nickel alloy steel, graphite composite, graphite nanotubes; aluminum and combinations thereof.

4. The interconnectable refractory anchor of claim 1, wherein a width of each tab is from 40 percent to 80 percent of a width of each side.

5. The interconnectable refractory anchor of claim 1, wherein a width of each side is from 40 percent to 100 percent of a width of the bottom side.

6. The interconnectable refractory anchor of claim 1, wherein the at least one of the obtuse angles can be an angle from 90 degrees to 180 degrees.

7. The interconnectable refractory anchor of claim 1, wherein the interconnectable refractory anchor is one piece and is secured to the vessel by welding.

8. The interconnectable refractory anchor of claim 1, wherein each tab main body extends through each bottom hole for containing refractory material within a closed geometric shaped space or formed U-shape space of the interconnectable refractory anchor.

9. The interconnectable refractory anchor of claim 1, wherein the moldable refractory material is a metal fiber reinforced refractory material.

10. An interconnected anchoring system for use in repair of protective ceramic refractory linings in high temperature severe duty vessels and for creating a protective ceramic refractory lining in high temperature severe duty vessels, the interconnected anchoring system comprising:
   a. a first interconnectable refractory anchor weldable to a vessel,
   b. a second interconnectable refractory anchor slidable into the first interconnectable refractory anchor; and
   c. a third interconnectable refractory anchor slidable into the first and second interconnectable refractory anchors forming the interconnected anchoring system with a plurality of closed geometric shaped spaces and generally U-shaped spaces adapted for receiving moldable refractory material, wherein the moldable refractory material is adapted to cure to a service temperature creating a protective ceramic refractory lining over the vessel and wherein each interconnectable refractory anchor comprises:
(i) a first tab with a first tab spacer guide extending transversely to a longitudinal axis of the first tab main body;
(ii) a first side integrally connected at a first obtuse angle to the first tab;
(iii) a second tab comprising a second tab spacer guide extending transversely to a longitudinal axis of the second tab main body;
(iv) a second side integrally connected at a second obtuse angle to the second tab;
(v) a bottom side integrally connected at a third obtuse angle with the first side and simultaneously integrally connected at a fourth obtuse angle with the second side, wherein the bottom side comprises a first bottom hole spaced apart from a second bottom hole; and
(vi) at least one first punched lance formed centrally in the first side; and at least one second punched lance formed centrally in the second side.

11. The interconnected anchoring system of claim 10, wherein the density of each of the interconnectable refractory anchors ranges from 13 interlocking anchors per square foot to 39 interlocking anchors per square foot.

\* \* \* \* \*